(12) United States Patent
Fowe

(10) Patent No.: US 10,401,173 B2
(45) Date of Patent: *Sep. 3, 2019

(54) ROAD SEGMENTS WITH MULTI-MODAL TRAFFIC PATTERNS

(71) Applicant: HERE Global B.V., Eindhoven (NL)

(72) Inventor: James Fowe, Evanston, IL (US)

(73) Assignee: HERE Global B.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 15/817,415

(22) Filed: Nov. 20, 2017

(65) Prior Publication Data

US 2018/0080773 A1    Mar. 22, 2018

Related U.S. Application Data

(63) Continuation of application No. 14/987,854, filed on Jan. 5, 2016, now Pat. No. 9,851,205.

(51) Int. Cl.
*G01C 21/34* (2006.01)
*G01C 21/10* (2006.01)

(52) U.S. Cl.
CPC ............. *G01C 21/10* (2013.01); *G01C 21/34* (2013.01); *G01C 21/3423* (2013.01); *G01C 21/3492* (2013.01)

(58) Field of Classification Search
CPC .... G01C 21/10; G01C 21/34; G01C 21/3423; G01C 21/3492
USPC ........................................................ 701/119
See application file for complete search history.

(56) References Cited

U.S. PATENT DOCUMENTS

| 9,851,205 B2* | 12/2017 | Fowe .................. G01C 21/10 |
| 2007/0208501 A1 | 9/2007 | Downs et al. |
| 2013/0275033 A1 | 10/2013 | Bastiaensen et al. |
| 2013/0282264 A1 | 10/2013 | Bastiaensen et al. |
| 2016/0379489 A1 | 12/2016 | MacFarlane |

FOREIGN PATENT DOCUMENTS

WO    WO2015026458    2/2015

OTHER PUBLICATIONS

Aguilera et al., New Kind of Fundamental Diagram with an Application to Road Traffic Emission Modelling, Mar. 2014, ResearchGate.
Salamati et al., Emission Estimation at Multilane Roundabouts: Effect of Movement and Approach Lane, Nov. 14, 2012, N.C. State University.
Xu et al., Identifying Urban Traffic Congestion Pattern from Historical Floating Car Data, 2013, pp. 2084-2095, Wuahan University.

* cited by examiner

*Primary Examiner* — Gertrude Arthur Jeanglaude
(74) *Attorney, Agent, or Firm* — Lempia Summerfield Katz LLC

(57) ABSTRACT

A method and system include identification of road segments with multi-modal traffic patterns. A server receives speed data for a link. The server calculates a quantity of speed clusters from the speed data. The server calculates speed profiles for the quantity of speed clusters. The server identifies one or more modes of transportation for the link based on the quantity of the speed clusters and the speed profiles for the quantity of speed clusters.

20 Claims, 11 Drawing Sheets

ROAD SEGMENTS WITH MULTI-MODAL TRAFFIC PATTERNS

CROSS REFERENCE TO RELATED APPLICATIONS

This application is a continuation under 35 U.S.C. § 120 and 37 CRF § 1.53(b) of U.S. patent application Ser. No. 14/987,854 now U.S. Pat. No. 9,851,205 filed Jan. 5, 2016, the disclosure of which is incorporated herein by reference in its entirety.

FIELD

The following disclosure relates to mapping and navigation devices or services.

BACKGROUND

Navigation systems are used by people and vehicles for routing and directions in order to travel between two locations. Navigation systems require accurate traffic information to properly route vehicles. When roads include multiple modes of transportation, traffic estimation may be difficult.

Traffic service providers may use probes to acquire traffic information. If probes are handled naively without any investigation into the sources of the probes, errors in traffic speed estimation may be introduced. Apart from intrinsic errors that arise from positional accuracy, there may be errors introduced by probes from other transportation modes. For example, averaging probes from bikes or pedestrians with vehicles may cause errors in estimating traffic condition. Errors may be prevalent in probes sourced from smartphones in which the data does not indicate if the user is driving or walking or running more information collected with probes may be beneficial, but if the information cannot be identified or classified as coming from a known source, the additional information may not be useful, but rather detrimental to estimating traffic patterns.

SUMMARY

A method including receiving speed data for a link. A processor calculates a quantity of speed clusters from the speed data. The processor calculates at least a first speed profile for a first speed cluster and a second speed profile for a second speed cluster. The processor identifies one or more modes of transportation for the link based on the quantity of speed clusters and at least the first speed profile and the second speed profile.

An apparatus including at least one processor and at least one memory. The processor identifies traffic data for a plurality of links. The processor calculates a quantity of speed clusters for each link of the plurality of links from the traffic data. The processor identifies a plurality of contiguous links in the plurality of links. The processor generates a link strand of the plurality of contiguous links which have an equal quantity of speed clusters.

An apparatus including at least one processor and at least one memory. The processor identifies a starting location and a destination. The processor transmits a request for a route from the starting location to the destination. The processor receives the route. The route includes a link with a multi-modal traffic pattern including one or more speed clusters. Each of the one or more speed clusters include a speed profile. The route is generated using a selected speed profile for the link.

BRIEF DESCRIPTION OF THE DRAWINGS

Exemplary embodiments of the present invention are described herein with reference to the following drawings.

DETAILED DESCRIPTION

The following embodiments relate to determining multi-modality of road segments (links). Traffic data including speed data may be provided from probes to a traffic service provider (TSP). A probe may be a mobile device or tracking device that provides samples of data for the location of a device, person, or vehicle. The probes may be mobile phones running specialized applications that collect location data as people travel along roads as part of their daily lives. Probes may transmit location and speed data for particular point in time. The speed data may be combined with historical traffic and speed data to identify a multi-modal traffic pattern for a road segment. The multi-modal traffic pattern may then be used to generate a route or broadcast the multi-modal traffic pattern to navigation systems and devices.

The TSP may receive data indicative of a speed and data indicative of a location from a probe. Aggregating multiple probe reports for a location and single time period (epoch) may allow the TSP to better analyze the traffic pattern. However, certain roads or locations may show multiple variations in speeds for different probes. There may be multiple clusters of speeds in the same time period, that depict some very high speeds, some middle speeds and some very low speeds close to zero. Without further calculation, the TSP may be unable to determine an accurate traffic pattern for the location for that time period. Each of the speed reports may be received from a probe located in or on pedestrians, cars waiting at traffic stoplights, bikes, a marathon runner or trucks or cars among others. Calculating an average of naive probe speed reports may lead to incorrect traffic estimates, for example, estimating either false congestion or missed congestion.

The multi-modal traffic pattern of a link may indicate that there are multiple modes of transportation moving at different speeds on the link. In certain embodiments, a server receives speed data from one or more probes. The speed data may represent a speed distribution for a link for a period of time. For the speed distribution, the server uses a multi-modality detection algorithm to determine one or more speed clusters. A multi-modality value may be determined counting the speed clusters. The server using the multi-modality detection algorithm, calculates a speed profile for each speed cluster detected. The server identifies a multi-modality traffic pattern of the link based on the number of speed clusters and speed profile of each speed cluster. The server may use the multi-modal traffic pattern of the link including the number of speed clusters and speed profile of each speed cluster to generate a route or update traffic conditions. The server may use the multi-modal traffic pattern to estimate lane level traffic. The server may use the multi-modal traffic pattern to estimate traffic conditions where there is sparse data.

Figure 1:
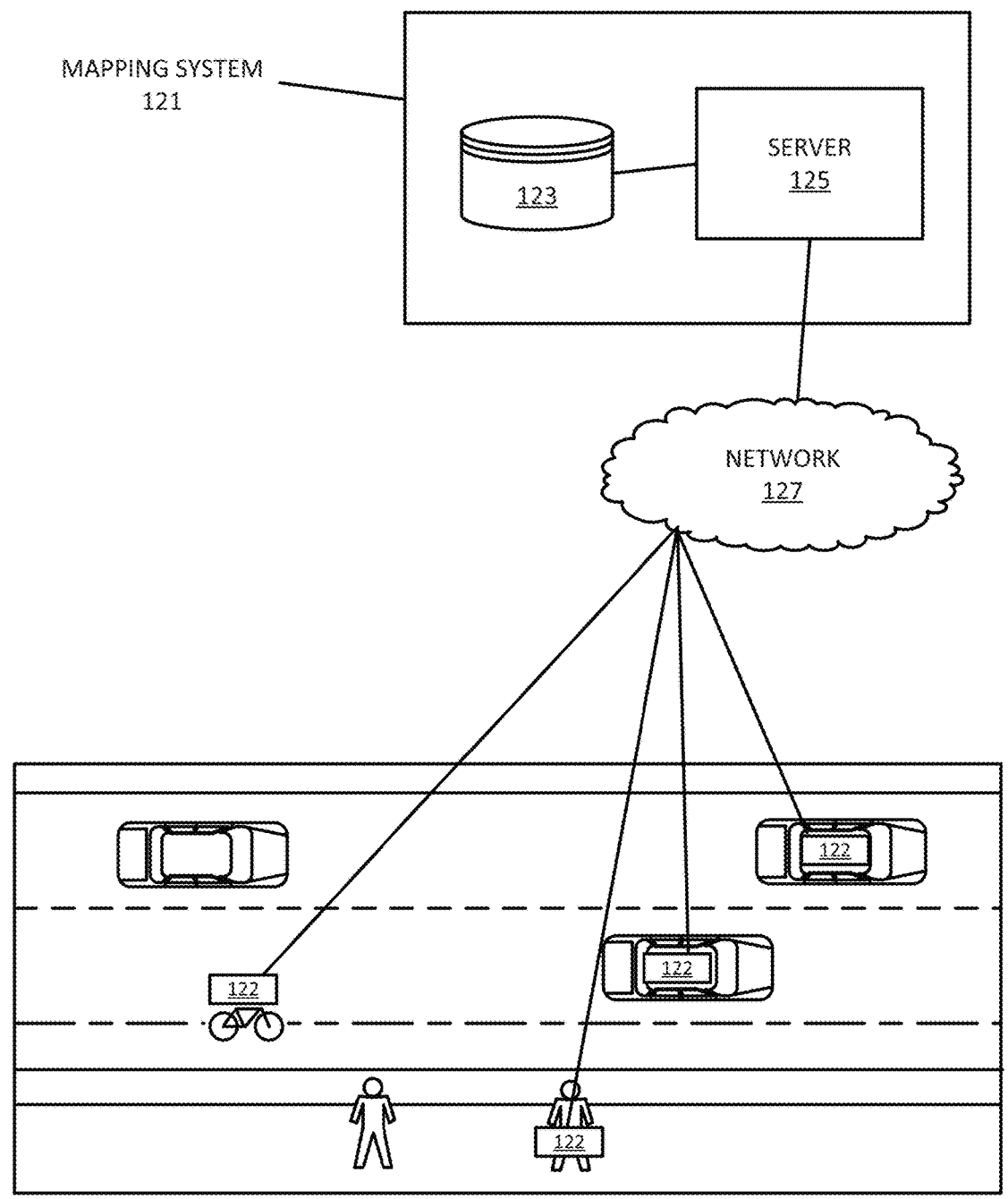
FIG. 1 illustrates an example system for identifying road segments with multi-modal traffic patterns.

FIG. 1 illustrates an example system for identifying road segments with multi-modal traffic patterns. The system includes one or more devices 122, a network 127, and a mapping system 121. The mapping system 121 may include a database 123 and a server 125. Additional, different, or fewer components may be included.

The mapping system 121 may include multiple servers, workstations, databases, and other machines connected together and maintained by a map developer. The mapping system 121 may be configured to identify or estimate multi-modal traffic patterns. The mapping system may also be configured to generate routes or paths between two points (nodes) on a stored map. The mapping system 121 may be configured to provide up to date information and maps to external map databases or mapping applications. The mapping system 121 may be configured to encode or decode map or geographic data. The multi-modal traffic patterns identified are stored by the mapping system 121 in the map database 123.

The map database 123 (also referred to as a database or a geographic database) may include geographic data used for traffic and/or navigation-related applications. The geographic data may include data representing a road network or other system including link data and node data. Other formats than links and nodes may be used for the geographic data. The geographic data may include structured cartographic data. The map database 123 may store data for other forms of travel such as walking or biking.

The map database 123 may store traffic data including speed, flow, congestion data or other traffic conditions. The traffic data may be associated with the link and node data. The traffic data may be associated with a strand or series of connected links. The traffic data may associated with a specific epoch (a specific time period). The traffic data may include historical data and estimated data. The traffic data may be derived from a traffic model using other traffic data.

The map database 123 may include node data records or link data records, point of interest (POI) data records, and other data records. More, fewer or different data records may be provided. In certain embodiments, the other data records include cartographic data records, routing data, and maneuver data. One or more portions, components, areas, layers, features, text, and/or symbols of the POI or event data may be stored in, linked to, and/or associated with one or more of the data records. For example, one or more portions of the POI, event data, or recorded route information may be matched with respective map or geographic records via positional data or Global Positioning System (GPS) data associations (such as using known or future map matching or geo-coding techniques).

The map database 123 may be maintained by a content provider (e.g., a map developer). By way of example, the map developer may collect geographic data to generate and enhance the geographic database 123. There may be different ways used by the map developer to collect data. The different ways may include obtaining data from other sources, such as businesses, municipalities or respective geographic authorities. In addition, the map developer may employ field personnel to travel throughout the geographic region to observe features and/or record information about the roadway. Remote sensing, such as aerial or satellite photography, may be used. The database 123 is connected to the server 125.

The map database 123 and the data stored within the map database 123 may be licensed or delivered on-demand. Other navigational services or traffic server providers may access the traffic data including the multi-modal traffic patterns stored in the map database 123. The traffic data including the multi-modal traffic patterns for a link may be broadcast as a service.

The server 125 may be a host for a website or web service such as a mapping service and/or a navigation service. The mapping service may provide maps generated from the geographic data of the database 123, and the navigation service may generate routing or other directions from the geographic data of the database 123. The mapping service may also provide information generated from attribute data included in the database 123. The server 125 may also provide historical, future, recent or current traffic conditions for the links, segments, paths, or routes using historical, recent, or real time collected data. The server 125 may be configured to analyze collected traffic data to determine multi-modality for segments or links. The server 125 may be configured to identify modes of transportation from collected traffic. The server 125 may be configured to analyze segments and links to determine road strands of similar modalities.

The server 125 is connected to the network 127. The server 125 may receive or transmit traffic data for roadway networks or navigable spaces through the network 127. The server 125 may also transmit paths, routes, or multi-modal traffic patterns through the network 127. The network 127 may include wired networks, wireless networks, or combinations thereof. The wireless network may be a cellular telephone network, LTE (Long-Term Evolution), 4G LTE, a wireless local area network, such as an 802.11, 802.16, 802.20, WiMax (Worldwide Interoperability for Microwave Access) network, or wireless short range network. Further, the network 127 may be a public network, such as the Internet, a private network, such as an intranet, or combinations thereof, and may utilize a variety of networking protocols now available or later developed including, but not limited to transmission control protocol/internet protocol (TCP/IP) based networking protocols.

The one or more devices 122 may include probe devices, probe sensors, or other devices 122 such as personal navigation devices 122. The server 125 may communicate with the devices 122 through the network 127. The server 125 may also receive traffic data from one or more systems or services that may be used to estimate or predict traffic conditions. The devices 122 may be a mobile device or a tracking device that provides samples of data for the location of a person or vehicle. The devices 122 may be mobile phones running specialized applications that collect location data as the devices 122 are carried by persons or things traveling the roadway system. The devices 122 may also be integrated in or with a vehicle.

Traffic data may also be collected with a sensor, or collection of sensors, such as an inductance loop or optical detector (e.g., camera, light detection and ranging (LiDAR), or radar device). The devices 122 and/or other sensor(s) may report the quantity, frequency, and/or speed of vehicles as the devices travel roadways. The road segment or link may be determined based on the geographical coordinates of the probe (e.g., global positioning system (GPS)). The one or more devices 122 and/or other sensor(s) may be designed to measure the volume, occupancy, and speed of traffic for a given point on a roadway.

Figure 2:
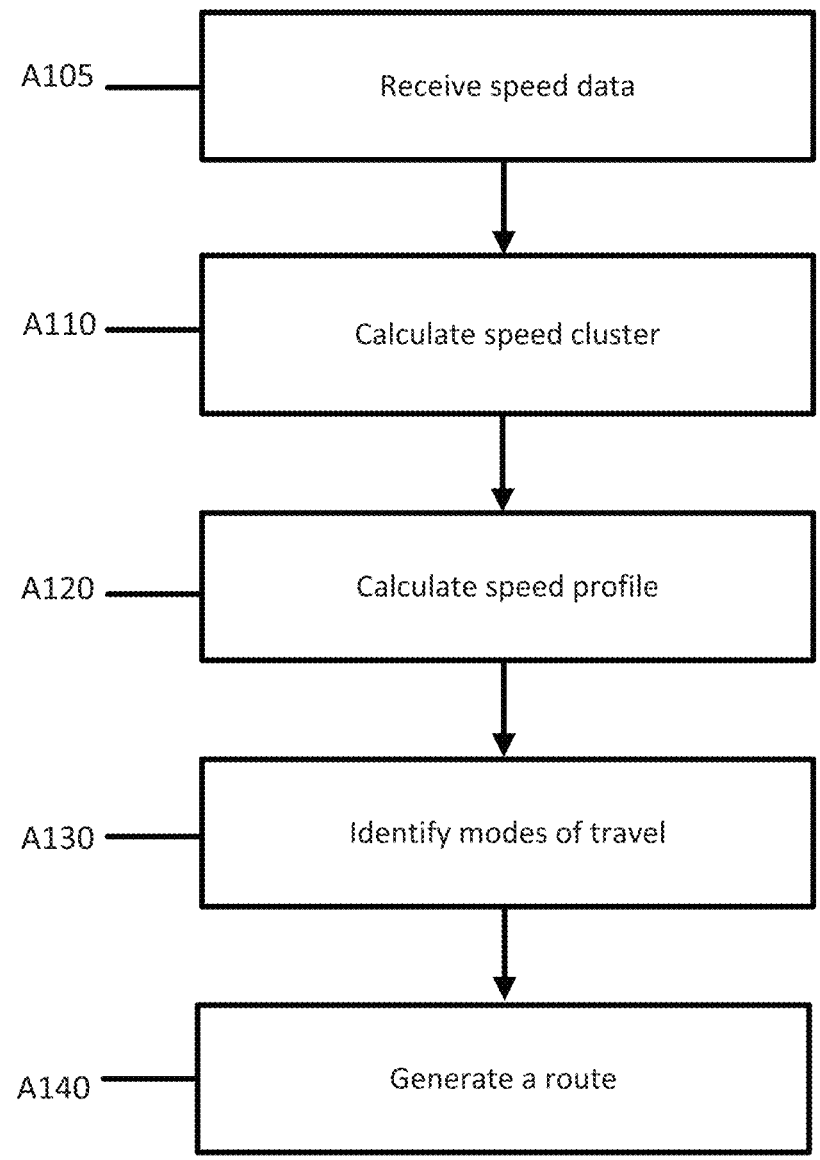
FIG. 2 illustrates an example flowchart for identifying road segments with multi-modal traffic patterns

FIG. 2 illustrates an example flow chart for identifying road segments with multi-modal traffic patterns. As presented in the following sections, the acts may be performed using any combination of the components indicated in FIG. 1, FIG. 5, or FIG. 6. The following acts may be performed by the server 125, the device 122, the mapping system 121, or a combination thereof. Additional, different, or fewer acts may be provided. The acts are performed in the order shown or other orders. The acts may also be repeated. Certain acts may be skipped.

At act 105, the server 125 receives speed data for a road link (segment). The speed data may include a time component and a location component along with the speed. The speed data may be collected by a probe device 122. Users may carry devices 122 on while in a vehicle, on a bike, while walking, among other modes of transportation. A probe device 122 may generate a report including a time, a location, and a speed of the device 122. The speed of the probe device 122 may be derived from two or more reports or measurements that include locations and times. The speed may be received with additional traffic data such as images, video, flow data, or other traffic condition data. The speed data may be historical speed or traffic data received from the database 123. The server 125 may collect speed data from speed probes and store the data in the database 123 for subsequent use. For a location and time, the server 125 may collect and the database 123 may contain multiple reports for both speed and traffic data.

Figure 3A:
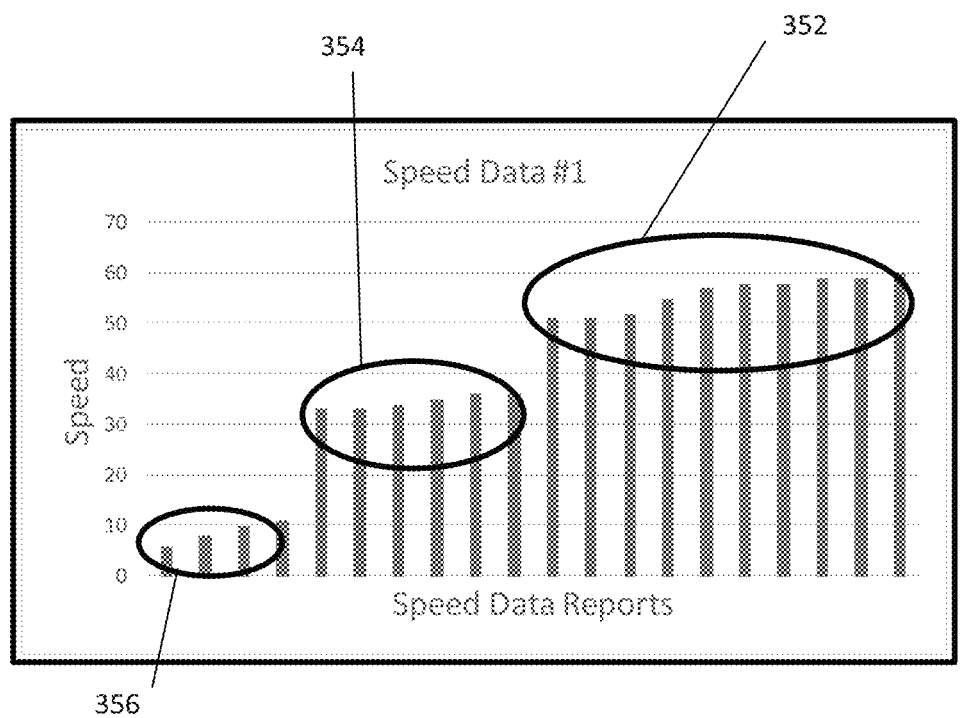
FIGS. 3A and 3B illustrate example speed distributions.
Figure 3B:
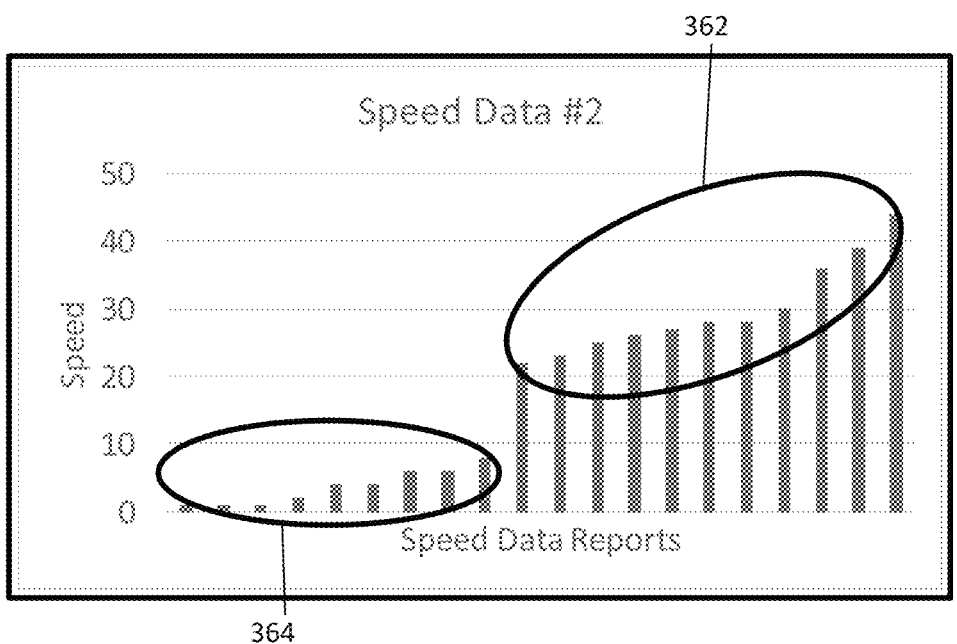

At act 110, the server 125 calculates a quantity of speed clusters from the speed data. A speed cluster is a grouping of speed data. Due to multiple modes of transportation, different speeds may exist on a segment for a certain time period or epoch. For example, speed data might be received from devices 122 on pedestrians, or devices 122 in cars waiting at traffic stoplights, or bikes, or a marathon runner or trucks or cars, etc. After receiving multiple reports of speed data, the distribution of speed data may cluster around certain speeds or ranges of speed. For example, a cluster for cars may correspond to a first speed range, a cluster for pedestrians may correspond to a second speed range, and a cluster for bicycles may correspond to a third speed range. FIGS. 3A and 3B illustrate multi-modal speed distributions.

FIG. 3A depicts an example of twenty different speed measurements taken over a five minute period at a specific link. The speed measurements have been rearranged in ascending order to better represent the different speed clusters. As shown, there are three separate clusters 352, 354, and 356, located around 10, 34, and 55 respectively. The speed here may be in Miles per Hour (MPH), Kilometers per Hour (KPH), or other measurement of speed. The three clusters may suggest three different types of travel such as by bus, by bike, and by car. The clusters may suggest a single form of travel, but different lane types such as by car, by car in a high occupancy lane, and an off ramp lane. Averaging all twenty reports together provides an average speed of 40.1, that as shown by the different data points is not indicative of travel on the link.

FIG. 3B depicts an example of twenty different speed measurements taken over a five minute period at a second specific link. The speed measurements have been rearranged in ascending order to better represent the different speed clusters. As shown, there are at least two separate clusters 362 and 364. The first cluster 364 includes the speed measurements between 1 and 8. The second cluster 362 includes the speed measurements between 22 and 44. The second cluster 362 may in certain circumstances be split up into two separate clusters depending on the type of road. However, if for example, the link has a speed limit of 30, the outlier speed data of 39 and 44 may just be that, an outlier representing a speeding vehicle. Taken naively, the set of data has an average speed of 18.05. The average speed of 18.05 would be much lower than the actual speed if, for example, the clusters are determined to represent pedestrians (1-8) and vehicles (22-44). The average speed of the faster cluster (22-44) is 29.8 that may give a more accurate estimate for the traffic pattern for vehicular travel.

To identify multi-modality, the server 125 partitions the speed data. The server 125 runs a clustering algorithm to determine disparate clusters. The clustering algorithm may not need store the desired number of clusters a-priori, but clustering algorithm may be configured to identify a number of clusters. Identifying the number of clusters is achieved by partitioning the range of speeds into N possible partitions representing different value spreads; N may be for example 8, 16, or 20 among others. The number of partitions may be determined by the type and amount of data. For larger spreads of data (higher speed spreads) more partitions may be used.

Figure 4:
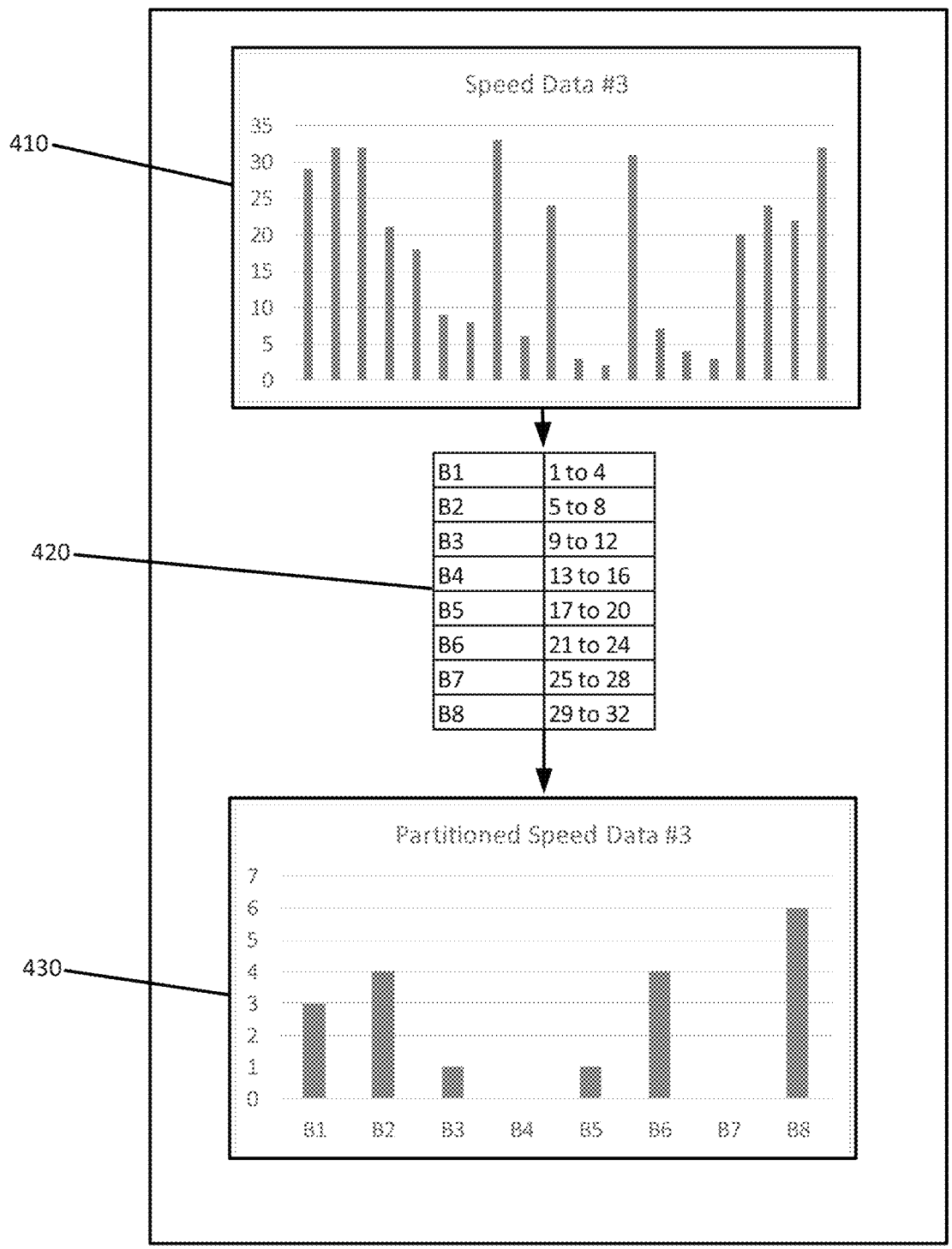
FIG. 4 illustrates an example of partitioned speed data.

FIG. 4 illustrates partitioning data into eight partitions. The received speed data 410 is given in miles per hour (mph). The received speed data 410 is placed into each partition or bucket that corresponds to a range of speeds that are indicated by the table 420. For example, speed data from 1 to 4 mph is assigned to B1, speed data from 5 to 8 is assigned to b2 and so on. The output is the partitioned speed data 430. Partition b1 includes three pieces of data, partition b2 includes three pieces of data, partition b3 includes one piece of data, and so on.

In an example partitioned speed distribution with eight partitions, the range of speeds may start from the maximum or speed value in partition b1 to the lowest speed value in partition b8. All eight partitions have equal range values. For example, an example Link001 with speed distribution (16.0, 35.0, 35.0, 2.0, 18.0, 3.0, 21.0, 4.0, 36.0, 6.0, 6.0, 8.0, and 9.0) may be partitioned into eight equal speed range partitions. The maximum speed value is 36, the lowest 2. Eight equal speed partitions would be: b1=a set of speeds within 31.75 to 36.0 and b2=27.5 to 31.75, b3=23.25 to 27.5 . . . b8=2 to 6.25. All the probe speeds on the link Link001 that fall within the speed ranges in each set (b1, b2, . . . bN) are partitioned into the set bi (b1, b2 . . . bN). After partition, the mean speeds of each of the partitions are calculated and compared with the mean speed of partition b1 and a determination of bi-modality (more than one mode or cluster in the distribution) is done by analyzing the speed clusters using a multi-modality detection algorithm.

For Link001 there is two-dimensional multi-modality in the set of probe-speeds obtained for the epoch as calculated by the multi-modality detection algorithm. Broadcasting a mean average (15.3 MPH) of the probe speeds may lead to an incorrect traffic estimate, such as either false congestion or missed congestion. Using a multi-modal identification algorithm, the set of speeds are partitioned into two clusters, for Link001—HS (higher speed) and LS (lower speed). Sometimes the number of speed profile is >2 and may get up to 4 or more in dense mobility areas of a city.

At act 120, the server 125 calculates a speed profile for each of the quantity of speed clusters. The speed profile may be the average or mean speed for each cluster. For the example given above for Link001, the speed profile for the HS cluster is 35.33; the speed profile for the LS cluster is 9.33. The speed profile may be calculated using a weighted average. The speed profile may exclude outliers such as the highest and lowest speed in each cluster. The speed profile may use the harmonic mean or other averaging calculation of the speed data in a cluster. The harmonic mean may be calculated as the reciprocal of the arithmetic mean of the reciprocals.

At act 130, the server 125 identifies one or more modes of transportation for the link based on the quantity of speed clusters and speed profile for each speed cluster. Modes of transportation such as by car, by foot, or by bicycle may have different ranges of potential speeds. For example, a pedestrian may travel at around 7-8 MPH, while the speed of a cyclist may be much more likely to be found in the range of 12-20 MPH. A mode of transportation may be identified using the speed cluster data along with other attributes such as the location of the link. A functional roadway classifier such as arterial, collector, or local may be used to identify modes of transportation. Further attributes such as rural, urban, or suburban may also affect the identified modes of travel. For example, a rural link may be less likely to have a traffic pattern for cyclists. An urban link may be more likely to have a traffic lights. A link which is part of a highway system may be more likely to have off ramps, on ramps, a high occupancy lane, among others. A rural road with a MM of (2) may select modes of travel from cars, trucks, or farm equipment. An urban road with an MM of (4) may be more likely to have pedestrians, cyclists, cars, and bus, but not trucks. A suburban highway with an MM of (2) may only have one mode of transportation (cars and trucks combined), but may have two traffic patterns due to local versus through traffic. A path through a park may be limited to a MM value of (3) of less comprising pedestrians, runners, and cyclists.

The speed clusters and speed profiles may also be matched with other traffic data collected. The server 125 may use other stored attributes of the links to identify modes of transportation. In certain embodiments, the server 125 may not identify the type of transportation, but only that there are more than one different types of transportation in the link's traffic pattern. In certain embodiments, the server 125 may identify the quantity of speed clusters as relative speed cluster. For example, the server 125 may identify a speed cluster as a low speed cluster or a high speed cluster. A low speed cluster may be a speed cluster with a speed profile of less than (5) or less than (10). A high speed cluster may be for example a speed cluster with a speed profile that is above a posted speed limit.

At act 140, the server 125 generates a route for one of the one or more modes of transportation using the quantity of speed clusters and speed profile data. Once the server 125 has determined an accurate traffic pattern for a link, the server 125 may use the traffic pattern to generate a route based on travel time or speed. In certain roadway environments, there may be multiple paths or routes from a starting point to a destination. The server 125 may use traffic data such as average speed or congestion to identify the most efficient path or route. In the example illustrates above, the naive average speed (a simple average of each speed data received) may lead to incorrect assessments of the traffic pattern. The server 125 may incorrectly assess a link's speed as high or low that may induce the server 125 to select or not select the link for use in a route. But using the speed cluster and speed profile data, the server 125 may generate an accurate estimation that leads to a more efficient route or path. An algorithm such as Dijkstra's (or another shortest path algorithm) may only work correctly if the cost for each segment or link is correct.

The server 125 may broadcast information regarding the link with the multi-modal traffic pattern for other systems, devices 122, or services to use. Traffic patterns change throughout a day. In broadcasting traffic data that represents traffic conditions to navigation devices 122 or a mapping service, a naive TSP that only averages all speeds on a link may broadcast a traffic category or condition that is not representative of any mode of transportation, for example, broadcasting a slight congestion when in fact the true speeds are two separate clusters, for example fast-moving (representing vehicular traffic) and slow-moving (representing bikes on the road).

The server 125 may receive traffic reports from devices 122 or other sensors, determine new multi-modal traffic patterns and broadcast the updated information out to devices 122 for use. The multi-modal traffic pattern (MTP) may be an encoded object broadcast produced using the output of the speed-profile output of the multi-modal algorithm. Naive link information and traffic patterns (TP) may only contain average traffic speed per-epoch for each link. For example, in the form:

TP: <Link-ID>, <epoch>, <day-of-week>, <average-speed>

The new object description for MTP may be broadcasted as:

MTP: <Link-ID>, <epoch>, <day-of-week>, <MM>, <speed-profile-1>,<speed-profile-2>, . . . ,<speed-profile-MM>

The object description may also be written as:

MTP(MG=0.3,min-count=0.2): <Link-ID>, <epoch>, <day-of-week>, <MM>,<average-speed-1>,<average-speed-2>, . . . ,<average-speed-MM>

MG (Multi-Modal Gap) and the min-count may be tuning parameters used in the algorithm. The parameters may be changed to adjust the sensitivity of the algorithm for finding clusters. Depending on the volume or range of data, the parameters may need to be adjusted to limit false positives or omissions. Below is a different configuration of the tuning parameters:

MTP(MG=0.4,min-count=0.3): <Link-ID>, <epoch>, <day-of-week>, <MM>,<average-speed-1>,<average-speed-2>, . . . ,<average-speed-MM>

Example based only the data above for Link001 may be:
MTP: <Link001>, <100>, <5>, <2>, <35.3>,<9.3>

The linkID is Link001, the epoch is 100, the day of the week is 5 (Friday), the MM is 2, the first cluster has a mean speed of 35.3 and the second 9.3.

An expanded historical traffic patterns object for MTP that also contains TP data would be of the form:
MTP: <Link-ID>, <epoch>, <day-of-week>, <speed-average>, <MM>, <speed-profile-1>, <speed-profile-2> . . . <speed-profile-MM>. Or for example:
MTP: <Link-ID>, <epoch>, <day-of-week>, <TP-speed>,<MM>,<speed-profile-1>,<speed-profile-2> . . . <speed-profile-MM>

An example based only the data in Link001 may be:
MTP: <Link001>,<100>,<5>,<15.3>,<2>, <35.3>,<9.3>

The average of the set of speed=15.3; MM=2, meaning there are two speed-profiles; the average of the set of speeds in the first cluster=35.3; the average of the set of speeds in the second cluster=9.3.

The server 125 may use the multi-modality information of a link to identify links with lanes. Different lanes of the roads may have different speeds and in some cases different speed limits as well. For example truck-lanes may differ from car lanes, producing multi-modality in traffic speeds that the truck lanes are slower and the car lanes produce faster speeds (or vice versa). The multi-modal traffic pattern may help a TSP identify a historical estimate of average truck-lane-speeds and average car-lane speeds. The multi-modal traffic pattern may also be used in identifying bus-lanes, bike lanes, among others.

The server 125 may use the multi-modality information to identify links with traffic stoplights. Links with traffic stoplights may have more than one speed cluster. For links with stoplights, a navigation system may be able to select which traffic pattern from the multi-modality information is to be used. Either a higher speed profile where the waiting at traffic stoplights is requested (according to a user selection) or a lower speed profile that is representative of the average length of delay at stoplight depending on a user selection.

The server 125 may use the multi-modality information to fill spatial gaps of traffic speed profiles when there is sparse probe data for some links on a particular multi-modal traffic segment. Using the multi-modal traffic data, a TSP may predict that the next neighboring link (upstream and downstream) to have a similar multi-modal traffic pattern.

A TSP may use the multi-modality information to group together road links with similar levels of multi-modality. Grouping together links may assist in identifying roads (two or more connected segments) with multiple modes of transportation, for example, truck lanes, bike lanes, pedestrians, among others. An aggregation of links is based on the premise that neighboring road links may have similar properties, more so than distant links. A link showing multi-modality (MM) of two may be more likely to have another link showing MM=2 as a neighbor or in the same area.

Figure 5:
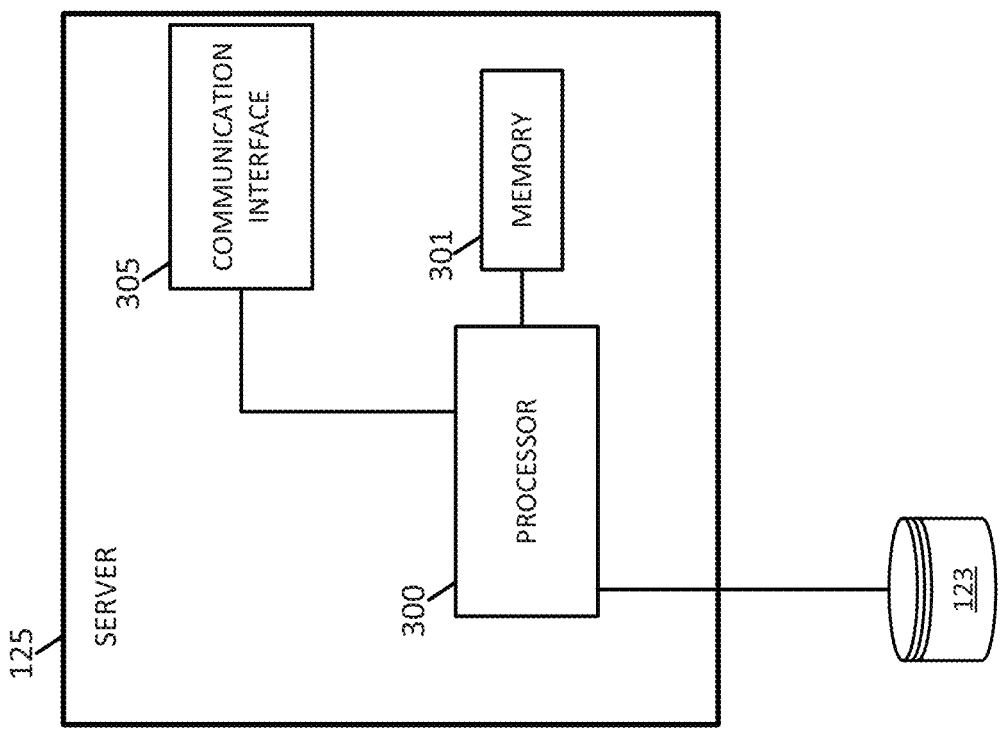
FIG. 5 illustrates an example server of the system of FIG. 1.

FIG. 5 illustrates an example server 125 of the system of FIG. 1. The server 125 includes a processor 300 that is connected to a communications interface 305 and a memory 301. The processor 300 is also connected to the database 123. The communications interface 305 is configured to receive speed data from one or more probes. The memory 301 is configured to store received real-time and historical speed data. The processor is configured to identify a strand including contiguous links with similar multi-modal traffic patterns. Additional, different, or fewer components may be included.

Figure 6:
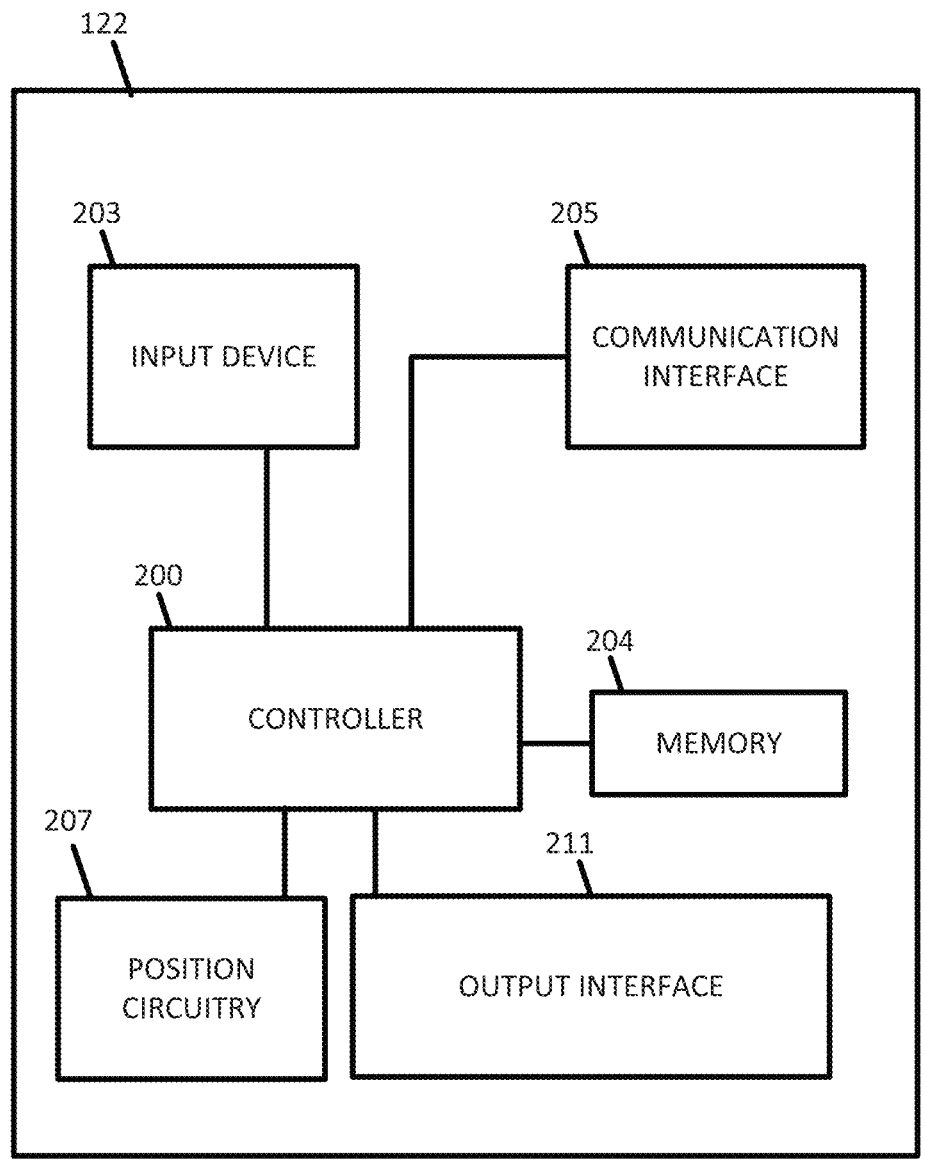
FIG. 6 illustrates an example device of the system of FIG. 1.

FIG. 6 illustrates an example device 122 of the system of FIG. 1. The device 122 may be configured to collect, transmit, receive, process, or display data. The device 122 may also be referred to as a probe 122, a mobile device 122 or a navigation device 122. The navigation device 122 includes a controller 200, a memory 204, an input device 203, a communication interface 205, position circuitry 207, movement circuitry 208, and an output interface 211. The output interface 211 may present visual or non-visual information such as audio information. Additional, different, or fewer components are possible for the mobile device 122. The navigation device 122 may be smart phone, a mobile phone, a personal digital assistant (PDA), a tablet computer, a notebook computer, a personal navigation device (PND), a portable navigation device, and/or any other known or later developed mobile device. In an embodiment, a vehicle may be considered a device 122, or the device 122 may be integrated into a vehicle.

Figure 7:
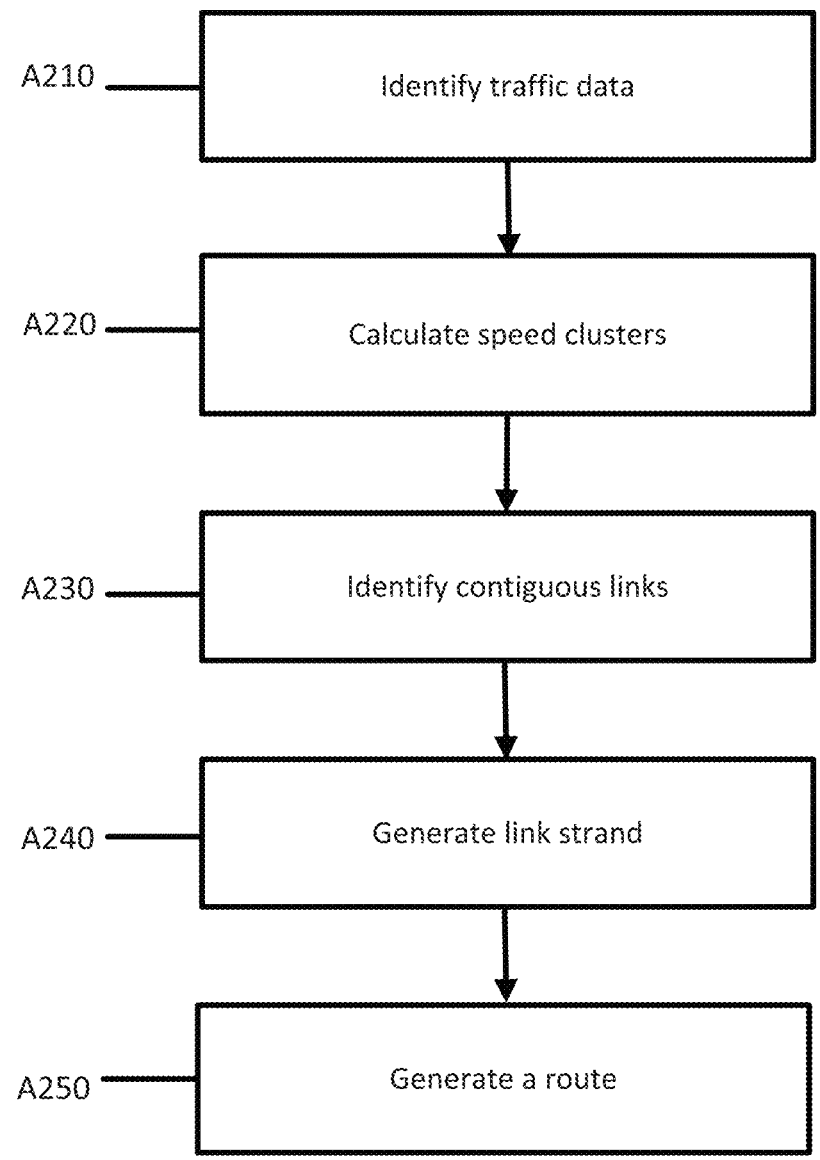
FIG. 7 illustrates an example workflow for identifying road strand including contiguous links with similar multi-modal traffic patterns.

FIG. 7 illustrates an example workflow for identifying road strand including contiguous links with similar multi-modal traffic patterns using the server 125 of FIG. 5. As presented in the following sections, the acts may be performed using any combination of the components indicated in FIG. 1, FIG. 5, or FIG. 6. The following acts may be performed by the server 125, the device 122, or a combination thereof. Additional, different, or fewer acts may be provided. The acts are performed in the order shown or other orders. The acts may also be repeated.

Figure 8:
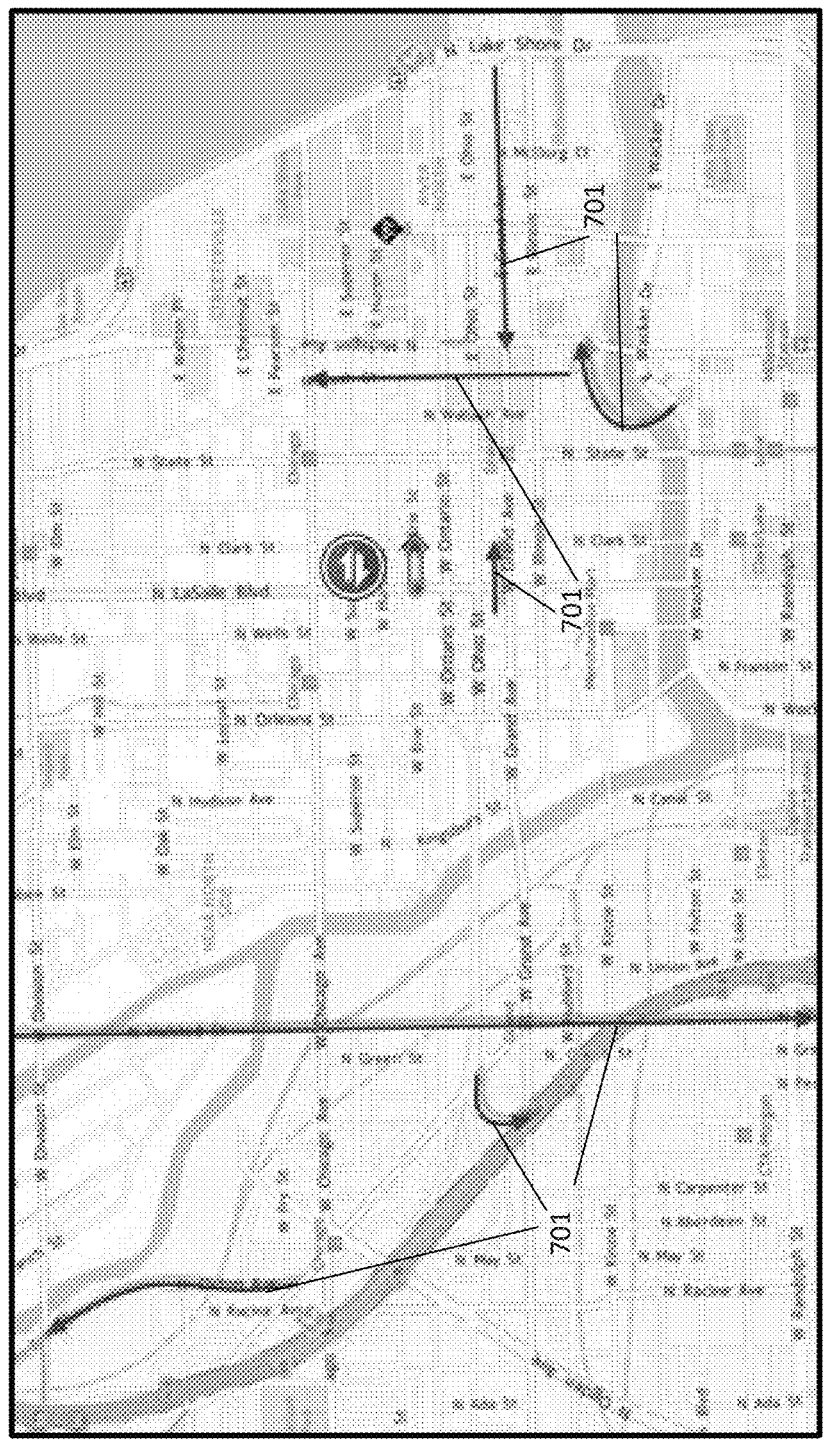
FIG. 8 illustrates strands including contiguous links with similar multi-modal traffic patterns.

FIG. 8 illustrates strands 701 including contiguous links with similar multi-modal traffic patterns. In FIG. 8, strands 701 are one directional aggregations of links. Strands 701 (or link strands or road strands) may be limited by certain rules such as an angle of a turn, a distance, or the similarity of the adjacent links. Strands 701 may assist in developing traffic patterns. A traffic pattern that exists on one or more links in the road strand may be imputed to the other links. Traffic patterns at one end of a strand may be used to estimate future traffic patterns at the other end. For strands that share multi-modal traffic patterns, a traffic service provider may use the strands to identify where certain lanes start and end. The multi-modal traffic patterns may also assist in identifying mass transportation services. Strands may be useful for autonomous vehicles or highly assisted driving.

At act 210, the processor 300 identifies traffic data for a plurality of links. The traffic data may be received directly or indirectly from probes or devices 122 located on the plurality of links. The traffic data may be identified in the map database 123. The traffic data may be received using the communications interface. The traffic data may be received over the network 127 including over a wired networks, wireless networks, or combinations thereof. The traffic data may include real-time, recent, or historical speed data. The traffic data may include positional and temporal components. The speed of the probe or device 122 may be derived from one or more sets of traffic data that includes positional and temporal data.

At act 220, the processor 300 calculates a quantity of speed clusters from the traffic data for the plurality of links. The number of speed clusters, or the multi-modality (MM) of a link may be calculated. In certain embodiments, the processor 300 may calculate a speed profile for the one or more speed clusters. The speed profile may be the mean speed for each speed cluster.

The speed clusters may be calculated using a multi-modal identification algorithm. The algorithm detects when there is multi-modality in a speed distribution, the number of clusters, and the speed profile (e.g. mean speed) for each cluster. Pseudo code for the multi-modal identification algorithm is shown below.

```
V ← {alistof probe speeds in an epoch}
function MDM (V):
    s ← STD(V)
    m ← mean(V)
    V ← V∀V < m + 2s & V >m − 2s // first outlier filtering
    d ← Range(V)/16
        for i ← 1 to 16 //patitioning
            b_i ← {V∀V < max(V)&V > (max(V) − d)}
            V ← V − b_i
        end for
    V ← b_1 + b_2 + . . . + b_16 //restoreV
    C ← 1
        for i ← 2 to 16 //cluster search
```

$$MG \leftarrow \frac{mean(b_1) - mean(b_i)}{Range(V)}$$

```
    if |b_1| > 8 and MG > 0.3 and|V −b_1 |> 8 //8&0.3aretuning paramters
    then{
```

-continued

```
    MD ← {C, mean(b₁), size(b₁), STD(b₁), MG}
    C ← C + 1
    V ← V - b₁
        b₁ ← bᵢ
    }
    else b₁ ← b₁ + bᵢ
    end if
end for
MD ← {C, mean(b₁), size(b₁), STD(b₁), MG}
return MD
end MDM
```

In the pseudo code shown above, the probe speeds may be filtered to detect outliers that are set aside. A number of buckets (as shown 16) are created with are equally spaced over the range of V. The mean speed for the first bucket is calculated. Each of the other buckets from 2-16 is then searched to identify a cluster. The algorithm may be tuned here using parameters to adjust the sensitivity for what constitutes a cluster in the speed distribution. The processor calculates the number of clusters, the average speed, the size, the standard deviation, and a multi-modal gap value. The multi-modal gap (MG) provides, for example, a number between 0 and 1 that indicates how far apart from the upper clusters a particular speed profile is. For example if a speed distribution produces three multi-modal speed profiles of 120, 80, and 8. 80 would have a moderate MG value while 8 may have a high MG value approximately 0.36 and 0.7 respectively. The MG may also be the distance a speed profile from a highest speed cluster is from a speed profile of a different speed cluster The outputs of the multi-modal identification algorithm may be three components. First, the number of clusters (also referred to as the multi-modal count) found in the distribution. Second, the speed profile of each cluster (e.g. the mean or average speed). Third, the multi-modal gap value. For each link, the data may be presented as MTP (MG=0.3, min-count=0.2): <Link-ID>, <epoch>, <day-of-week>, <MM>, <average-speed-1>, <average-speed-2>, <average-speed-MM>.

Table 2 below depicts five example links and the speed profiles for each. Each of the link speed distributions was run through the multi-modal identification algorithm to determine the MM and the speed profiles for each cluster. Each of the five links has a MM value of (2) including a HS (high speed) cluster and a LS (low speed) cluster. The average speeds for the HS and LS clusters are shown under the speed data.

TABLE 1

Link001: [16.0, 35.0, 35.0, 2.0, 18.0, 3.0, 21.0, 4.0, 36.0, 6.0, 6.0, 8.0, 9.0]
HS: 35.333333333333336
LS: 9.3
Link002: [0.0, 35.0, 19.0, 5.0, 42.0, 25.0, 10.0]
HS: 30.25
LS: 5.0
Link003: [1.0, 33.0, 27.0, 14.0]
HS: 24.666666666666668
LS: 1.0
Link004: [0.0, 2.0, 2.0, 48.0, 6.0, 9.0, 40.0]
HS: 25.75
LS: 1.3333333333333333
Link005: [34.0, 32.0, 4.0, 7.0, 14.0]
HS: 26.666666666666668
LS: 5.5

At act 230, the processor 300 identifies contiguous links. The processor may identify an angle between a pair of adjacent links, and compare the angle to a predetermined angle threshold. A predetermined angle threshold may be, for example, 110 degrees, 120 degrees, or 150 degrees among others. The predetermined angle threshold may also have an upper bound such as 250 degrees, 240 degrees, or 210 degrees among others. Adjacent links that satisfy the predetermined angle threshold may be identified as contiguous—next in sequence. Adjacent herein refers to links that are connected. Contiguous refers to links that are both connected and share an angle greater than a predetermined angle.

At act 240, the processor 300 generates a link strand. The processor 300 may identify a MM similarity between a pair of contiguous links and compare the MM similarity to a predetermined similarity threshold. If the contiguous links satisfy the similarity threshold, the contiguous links may be aggregated to generate a link strand (or strand).

The processor 300 aggregates directed contiguous links on a roadway map (or network graph, or link node graph) with similar MM value and angle between their link-shape-points greater than Y into a strand of length less than X. Directed links refer to the direction the traffic follows. In certain embodiments, only links that include travel in a single shared direction may be aggregated. Travel on the links in the opposite direction may be calculated separately. Similar MM value may include equal MM value or links that are within one MM value or within two MM value.

FIGS. 9A, 9B, 10A, 10B, and 10C illustrate examples of links that may or may not be aggregated into a strand. For the examples in FIGS. 9A, 9B, 10A, 10B, and 10C, the processor 300 may aggregate links into strand according to one or more rules. A first rule may establish that the MM value be equal (similarity threshold) for links to be aggregated. For example, during aggregation, break an MTS strand if the MM values are different. A second rule may state that the predetermined angle threshold (or range) for a strand is 120 degrees with an upper bound of 240 degrees. For example, during aggregation, an MTS strand is broken if the link meets an intersection of angle less than 120 degrees or greater than 240 degrees. A third rule may state that at intersections with more than one downstream links that meet the criteria in the first rule, a strand continues only on the link with the angle closest to 180 degrees.

Figure 9A:
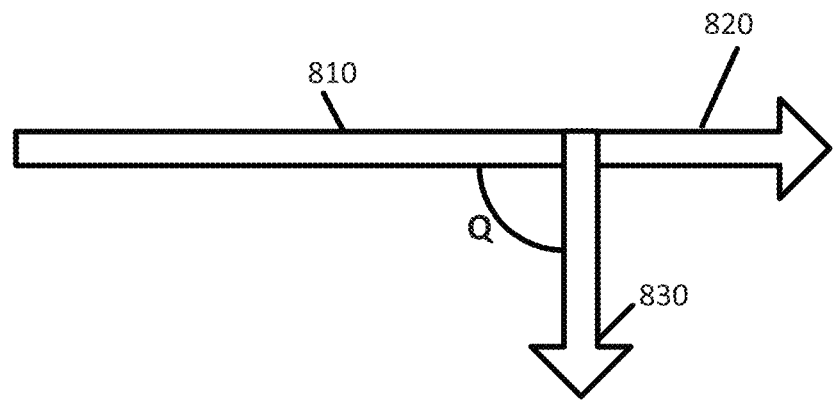
FIGS. 9A and 9B illustrate adjacent road segments.

In FIG. 9A, links 810, 820, and 830 are shown. Each link has a MM value of (2) (two clusters). The angle Q is 90 degrees. When generating a strand, the processor 300 determines if the MM values of contiguous links are equal. Here the MM value of 810 is (2). The MM value of 820 and 830 are both (2). Both 820 and 830 satisfy the MM similarity rule (first rule). The server 125 then determines if the angle is greater than a predetermined threshold (or inside a range). Here the angle between 810 and 820 is 180 degrees (flat or a straight line). The angle between 810 and 830 is 90 degrees. The angle between 810 and 820 meets the threshold of greater than 120 degrees. The angle between 810 and 830 does not meet the threshold. For the example in 8A, the links 810 and 820 may be aggregated into a strand. The processor 300 may then identify a next link that is adjacent to link 820 to see if the strand continues.

Figure 9B:
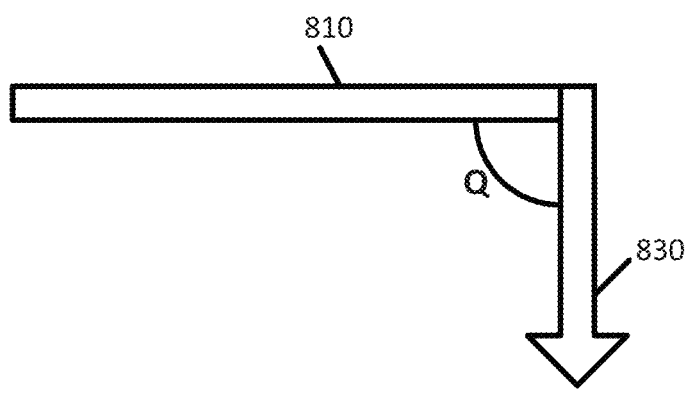

In FIG. 9B, links 810 and 830 are shown. Each link has an MM value of (2). The angle Q is 90 degrees. As in the example in FIG. 9A, both links satisfy MM similarity. Also as in FIG. 9A, the angle does not pass the threshold and as such, there is no strand generated.

Figure 10A:
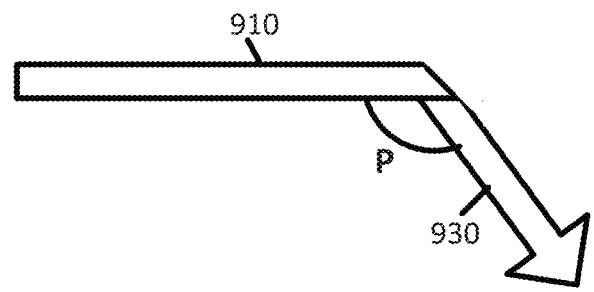
FIGS. 10A, 10B, and 10C illustrate adjacent road segments.

In FIG. 10A, links 910 and 930 are shown. Each link 910, 930 has an MM value of (3) (three clusters). The angle P is 135 degrees. The links 910 and 930 are contiguous as the angle is greater than the predetermined threshold. The links share a similar MM value of (3). The server 125 will aggregate the links 910 and 930 into a strand.

Figure 10B:
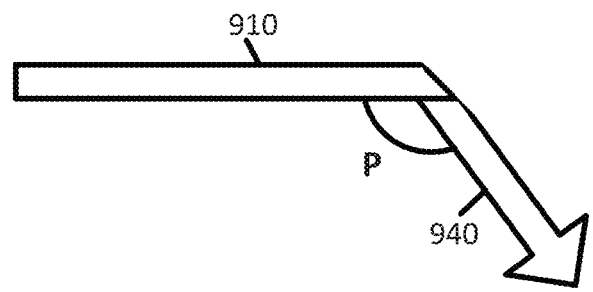

In FIG. 10B, links 910 and 940 are shown. Link 910 has an MM value of (3). Link 940 has an MM value of (4). The angle P is 135 degrees. The links are contiguous as the links are adjacent and have an angle within the predetermined range 135>120. However, Link 940 has a different MM value (4) than that of Link 910 (3). The processor 300 will not aggregate the two links into a strand.

Figure 10C:
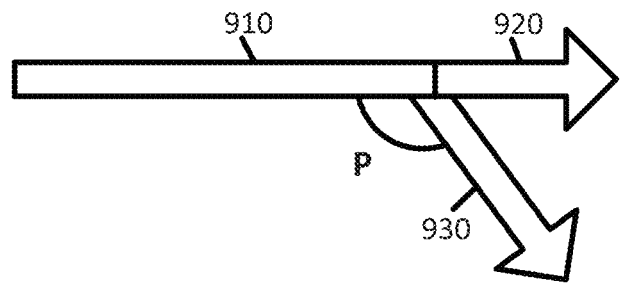

In FIG. 10C, links 910, 920, and 930 are shown. Each link 910, 920, 930 has an MM value of (3). The angle P is 135 degrees. The links 910 and 920 are contiguous as the links are adjacent and have an angle that meets the threshold: 180 is greater than 120. The links 910 and 920 further share a similar MM value of (3). The links 910 and 930 are contiguous as the links are adjacent and have an angle that meets the predetermined threshold: 135 is greater than 120. The links 910 and 930 further share a similar MM value of (3). The links 920 and 930 are not contiguous as the angle is less than 120 degrees (180 minus 135 equals 45 degrees). The server may follow the third rule listed above that requires that at intersections with more than one downstream links that meets the criteria in the first rule, a strand continues link with the angle closest to 180 degrees. The links 910 and 920 share a 180 degree angle and may be aggregated by the processor 300 into a strand.

In the example shown in FIGS. 9A, 9B, 10A, 10B, and 10C, the similarity threshold may have been determined first. In certain embodiments, the angle threshold for adjacent links or other rules or criteria may be determined first. Strands generated may be given a unique segment/strand ID (Long Integer). Once a strand has been generated, the strand ID may be stored as an attribute in the map database 123. Other attributes such as the MM value of the strand may be stored in the map database 123 as well. A link-ID may only be associated with one strand ID. A link-ID may be associated with multiple strands if the strands overlap. A link-ID may be associated with multiple strands if the criteria or rules for strand generation are different for one set of strands to another. For example, urban strands may have different set of rules than rural strands. A link may be part of an urban strand and a rural strand. Strands may be limited to unidirectional strands containing at least two links. Although roadways may be bi-directional, the speed reports may be segregated into two groups, one for each direction. Strands for each direction may be generated and stored separately. Each link with multi-modality may not be part of an MTS. Certain links may exhibit multi-modality, but may be isolated from other links. The multi-modality of a link may also indicate that the link has a unique feature that differentiates the link from the link's neighbors. In certain embodiments, a strand may include non-adjacent links. A strand may skip over a link that may be an outlier. A strand may also skip over a link for which the map database 123 does not have enough data to make a multi-modality determination. A strand may impute the multi-modality of a two neighboring links to a link which has sparse data.

As shown in the examples in FIGS. 9A, 9B, 10A, 10B, and 10C, the criteria for similarity was limited to the MM value of the links. In certain embodiments, the similarity determination may include the speed profiles for each MM cluster. For example, although the MM values of two links may be equal, the speed profiles may be different. A link may have a MM value of (2), with speed profiles of <45> and <25>. An adjacent link may also have a MM value of (2), but with speed profiles of <25> and <4>. Even though the MM values are equal, the two segments do not exhibit the same traffic pattern. In order to be similar, the two links may need to have both the same MM and also similar speed profiles. In certain embodiments, the two links may only need to share related speed profiles even though their MM is different. Related speed profiles may require that each link has a cluster that shares a speed profile with a cluster in the second link within a certain standard of error. For example, each speed profile may be within 5%, 10%, or 15% among others.

In certain embodiments, the mode of transportation for each speed cluster in a link may be identified. For example, a link with MM of (2) with speed profiles of <25> and <9> may be identified as a link with both cars (the higher speed profile) and bicycles (the lower speed profile). If identified, the modes of transportation may be used to generate strands. For example, links may be determined to be similar for bicycles if adjacent links have similar speed profiles for bicycles regardless of if the links have disparate speed profiles for pedestrians or vehicles.

In addition to MM similarity, the processor 300 may also take into account other roadway features when generating a strand. Features or attributes such as the roadway type, the number of lanes, the posted speed limit, or lane identities among others may be used along with the multi-modality traffic patterns to generate strands.

Once the links have been aggregated and the strands generated, the strand information may be stored in the database 123. The processor 300 may use the strand information to help generate routes or provide navigational services to users. Strands may be used to estimate traffic along the entire strand. Strands may also be used to identify modes of transportation on one or more links. Using strands that may cover a large set of data, the mode of transportation may more efficiently and accurately determined. For example, one link in the strand may have been previously identified as including a bike lane. If the MM and speed profiles of the strand indicate that there may be a cluster in range of biking speed, the cluster may be imputed to be from bicycles based on the identification that at least one link in the strand has a bike lane. Imputing or estimating the modes of transportation may be done using predetermined thresholds, link attributes, or link locations. For example, if the MM for a strand is (3) on a freeway, the modes of transportation may be identified as vehicles with normal lanes, an HOV (high-occupancy), and/or an off-ramp or on-ramp.

The multi-modality traffic pattern information and/or the strand information may be broadcast or transmitted to a device 122. The device 122 may use the multi-modality traffic pattern information and/or the strand information to generate, update, or display route, path, or traffic information.

Figure 11:
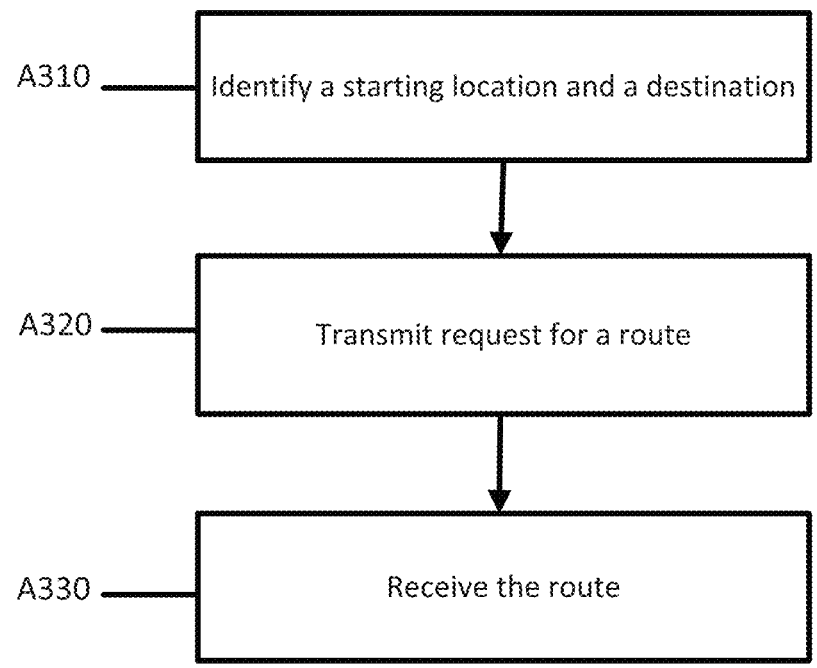
FIG. 11 illustrates an example flowchart for receiving a route using a multi-modal traffic patterns.

FIG. 11 illustrates an example workflow for generating a route using a multi-modal traffic patterns using the device 122 of FIG. 6. As presented in the following sections, the acts may be performed using any combination of the components indicated in FIG. 1, FIG. 5, or FIG. 6. The following acts may be performed by the server 125, the device 122, or a combination thereof. Additional, different, or fewer acts may be provided. The acts are performed in the order shown or other orders. The acts may also be repeated.

At act 310, the device 122 identifies a starting location and a destination. The starting location and destination may be identified though the input device 203. The input device 203 may be one or more buttons, keypad, keyboard, mouse, stylus pen, trackball, rocker switch, touch pad, voice recognition circuit, or other device or component for inputting data to the mobile device 122. The input device 203 and the output interface 211 may be combined as a touch screen that may be capacitive or resistive. The output interface 211 may be a liquid crystal display (LCD) panel, light emitting diode (LED) screen, thin film transistor screen, or another type of display. The output interface 211 may also include audio capabilities, or speakers.

The starting location may be identified using positional circuitry such as GPS or other positional inputs. The positioning circuitry 207, that is an example of a positioning system, is configured to determine a geographic position of the navigation device 122. The movement circuitry 208, that is an example a movement tracking system, is configured to determine movement of a navigation device 122. The position circuitry 207 and the movement circuitry 208 may be separate systems, or segments of the same positioning or movement circuitry system. In an embodiment, components as described herein with respect to the navigation device 122 may be implemented as a static device. For example, such a device may not include movement circuitry 208, but may involve a speed or velocity detecting input device 203.

The device 122 may identify its position as the device 122 travels along a route using the positional circuitry and services such as GPS. For indoor spaces without GPS signals, the navigation device 122 may rely on other geolocation methods such as LIDAR, radar, Wi-Fi, beacons, landmark identification, inertial navigation (dead reckoning), among others.

At act 320, the device 122 transmits a request for a route from the starting location to the destination. The device 122 may use the communications interface to transmit the request. The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format. The communication interface 205 and/or communication interface 305 may include a receiver and/or transmitter for digital radio signals or other broadcast mediums. A receiver and/or transmitter may be externally located from the device 122 such as in or on a vehicle.

At act 330, the device 122 receives the route. The route includes a link with a multi-modal traffic pattern including one or more speed clusters. Each of the one or more speed clusters may include a speed profile (or mean speed for the cluster). The route is generated using a selected speed profile for the link. In certain embodiments, the device 122 may select a speed profile to use based on an expected mode of transportation. For example, a device 122 that is used by a driver of a car may not make use of speed data for trucks, buses, pedestrians, or cyclists among others. For each link, the most accurate speed may be given by the mean speed (speed profile) of the cluster that corresponds to the mode of travel.

In certain embodiments, the device 122 receives the multi-modal traffic pattern for the link and generates a route. The device 122 may store link and link attributes locally in memory 204. The multi-modal traffic pattern for a link may be received as an object with the following format: MTP: <Link-ID>, <epoch>, <day-of-week>, <MM>, <speed-profile-1>, <speed-profile-2>, <speed-profile-MM>. Each speed profile may also be associated with a form of transportation. The memory 204 and/or memory 801 may be a volatile memory or a non-volatile memory. The memory 204 and/or memory 801 may include one or more of a read only memory (ROM), random access memory (RAM), a flash memory, an electronic erasable program read only memory (EEPROM), or other type of memory. The memory 204 and/or memory 801 may be removable from the mobile device 122, such as a secure digital (SD) memory card. The memory may contain a locally stored map database. The locally stored map database may be a copy of the map database 123 or may include a smaller piece. The locally stored map database may use the same formatting and scheme as the map database 123.

The device 122, using the controller 200, may generate a route using a shortest time to travel algorithm such as Dijkstra's algorithm. The routing algorithm may use the speed profile that most accurately conveys the speed of the link (and therefore time to travel). The controller 200 and/or processor 300 may include a general processor, digital signal processor, an application specific integrated circuit (ASIC), field programmable gate array (FPGA), analog circuit, digital circuit, combinations thereof, or other now known or later developed processor. The controller 200 and/or processor 300 may be a single device or combinations of devices 122, such as associated with a network, distributed processing, or cloud computing. The controller 200 may also include a decoder used to decode roadway messages and roadway locations.

The multi-modal traffic pattern information and/or strand information may also be used to directly or indirectly navigate a vehicle. The device 122 may be integrated into an autonomous driving vehicle or a highly assisted driving (HAD) vehicle. The device 122 may be configured as a navigation system for an autonomous driving vehicle or a HAD. An autonomous driving vehicle or HAD may take route instruction based on the link and node information provided to the navigation device 122.

Automated driving requires awareness of the map and awareness of the average historical speeds on the road. Awareness may be important for the autonomous driving vehicles to be aware if there are other modes of transportation on the same road segment, determining a multi-modality of a link or series of links may augment the intelligence, awareness and preparedness of the autonomous driving vehicle to avoid any kinds of collision. The multi-modal traffic segments are important in that an autonomous driving vehicle may confidently navigate a road segment or strand when the multi-modality value<2 and may also cautiously navigate road segments with multi-modality value>1 while being aware of other alternate historical speed profiles on each link on the road segment.

As described herein, an autonomous driving vehicle may refer to a self-driving or driverless mode that no passengers are required to be on board to operate the vehicle. An autonomous driving vehicle may be referred to as a robot vehicle or an autonomous driving vehicle. The autonomous driving vehicle may include passengers, but no driver is necessary. Autonomous driving vehicles may park themselves or move cargo between locations without a human operator. Autonomous driving vehicles may include multiple modes and transition between the modes.

As described herein, a highly assisted driving (HAD) vehicle may refer to a vehicle that does not completely replace the human operator. Instead, in a highly assisted driving mode, the vehicle may perform some driving functions and the human operator may perform some driving functions. Vehicles may also be driven in a manual mode that the human operator exercises a degree of control over the movement of the vehicle. The vehicles may also include a completely driverless mode. Other levels of automation are possible.

The autonomous or highly automated driving vehicle may include sensors for identifying the surrounding and location of the car. The sensors may include GPS, light detection and ranging (LIDAR), radar, and cameras for computer vision. Proximity sensors may aid in parking the vehicle. The proximity sensors may detect the curb or adjacent vehicles. The autonomous or highly automated driving vehicle may optically track and follow lane markings or guide markings on the road.

The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data.

Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

I claim:

1. A method comprising:
   receiving speed data for a link;
   calculating, by a processor, a quantity of speed clusters from the speed data;
   calculating, by the processor, at least a first speed profile for a first speed cluster and a second speed profile for a second speed cluster; and
   identifying, by the processor, lane level traffic estimates for a plurality of lanes of the link based on the quantity of speed clusters and at least the first speed profile and the second speed profile.

2. The method of claim 1, further comprising:
   generating, by the processor, a route from a starting point to a destination for the one or more modes of transportation using the lane level traffic estimates.

3. The method of claim 1, wherein calculating a quantity of speed clusters comprises:
   separating, by the processor, the speed data into one or more partitions; and
   analyzing, by the processor, the one or more partitions for bi-modality.

4. The method of claim 1, wherein the first speed profile is a mean speed of the first speed cluster.

5. The method of claim 1, further comprising:
   calculating, by the processor, a multi-modal gap; wherein the multi-modal gap is the distance a speed profile from a highest speed cluster is from a speed profile of a different speed cluster.

6. The method of claim 1, wherein the plurality of lanes includes at least a high occupancy lane.

7. The method of claim 1, wherein the plurality of lanes includes at least an off ramp lane.

8. The method of claim 1, further comprising:
   identifying, by the processor, a plurality of contiguous links; and
   generating, by the processor, a strand of the plurality of contiguous links with an equal quantity of speed clusters.

9. The method of claim 8, wherein identifying a plurality of contiguous links comprises:
   identifying, by the processor, an angle between a pair of adjacent links; and
   comparing, by the processor, the angle to a predetermined threshold.

10. The method of claim 8, wherein the plurality of contiguous links includes a same number of lanes.

11. The method of claim 1, wherein the speed data is historical speed data.

12. The method of claim 1, wherein the speed data is received for an epoch.

13. An apparatus comprising:
    at least one processor; and
    at least one memory including computer program code for one or more programs; the at least one memory and the computer program code configured to, with the at least one processor, cause the apparatus to at least perform:
    receive traffic data for a plurality of links;
    calculate a quantity of speed clusters for each link of the plurality of links from the traffic data;
    identify a number and type of lanes for each of the plurality of links from the quantity of speed clusters; and
    generate a link strand from contiguous links of the plurality of links that have a same number and same type of lanes.

14. The apparatus of claim 13, the at least one memory and the computer program code configured to, with the at least one processor, cause the apparatus to at least perform:
    calculate a speed profile for each of the quantity of speed clusters; wherein the link strand is further generated from the continuous links that have an equal quantity of speed clusters with related speed profiles.

15. The apparatus of claim 13, wherein a second link is a contiguous link to a first link when the second link is adjacent to the first link with an angle between the first and second links within a predetermined range.

16. The apparatus of claim 13, the at least one memory and the computer program code configured to, with the at least one processor, cause the apparatus to at least perform:
    generate a route from a starting point to a destination using the link strand.

17. A navigation device comprising:
    positional circuitry, the positional circuitry configured to identify a starting location;
    an input device, the input device configured to select a destination;
    a transmitter, the transmitter configured to transmit to a mapping service, a request for a route from the starting location to the destination; and
    a receiver, the receiver configured to receive the route from the mapping service, wherein the route includes a link with a multi-modal traffic pattern including one or more speed clusters; wherein each of the one or more speed clusters correspond to one or more lanes of the link; wherein the route is generated using a selected lane of the one or more lanes for the link.

18. The navigation device of claim 17, further comprising:
    a display, the display configured to display the route.

19. The navigation device of claim 17, wherein the route further includes a speed profile for each of the one or more lanes.

20. The apparatus of claim 17, wherein the one or more speed clusters are calculated from historical speed data for the link.

* * * * *